Figure 1:
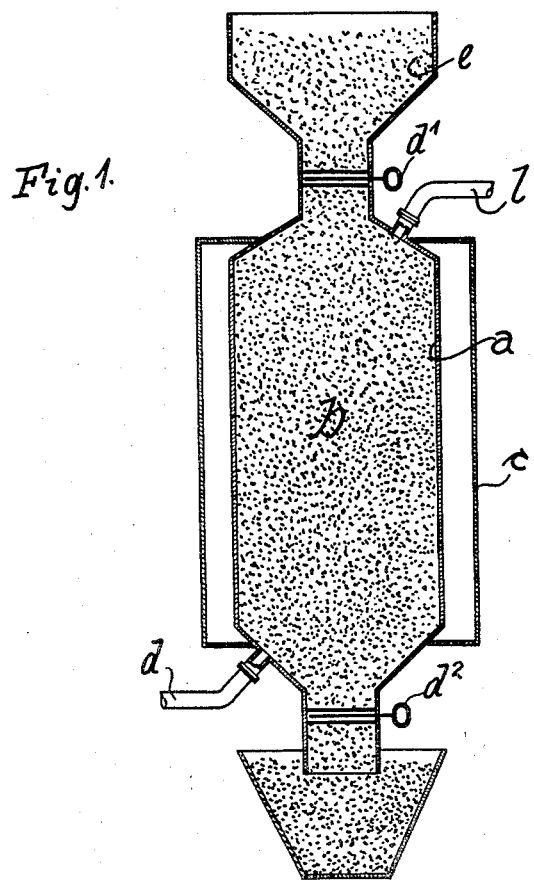

Fig. 2.
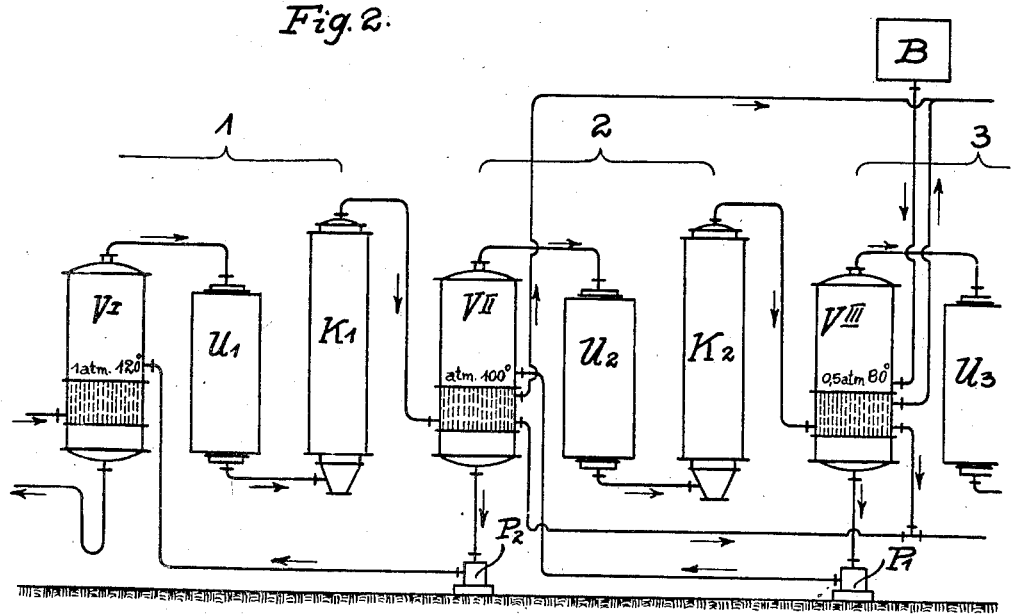
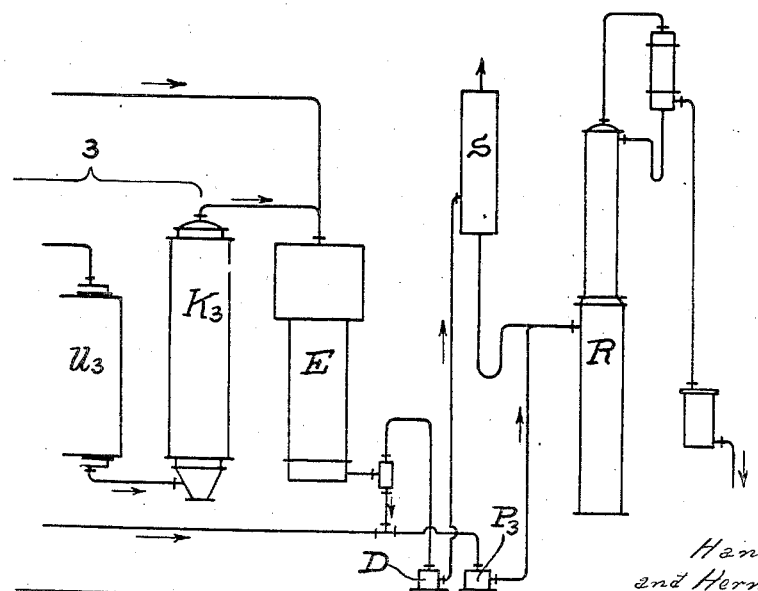

Patented Jan. 3, 1933 1,892,742

UNITED STATES PATENT OFFICE

HANS WALTER AND HERMANN SCHULZ, OF MAINZ-MOMBACH, GERMANY, ASSIGNORS TO DEUTSCHE GOLD- UND SILBER-SCHEIDEANSTALT VORMALS ROESSLER, OF FRANKFORT-ON-THE-MAIN, GERMANY, A CORPORATION OF GERMANY

PRODUCTION OF ACETONE

Application filed February 19, 1931, Serial No. 517,014, and in Germany January 26, 1928.

The present invention relates to the production of acetone from acetic acid, acetylene, alcohol, acetaldehyde, ethyl acetate or other ketonizable substances or mixtures of the same by passing their vapors mixed with steam at elevated temperatures over catalysts, disposed in chambers constructed of particular material.

It is already known, for example, to convert acetic acid into acetone by passing its vapors together with steam over lime, iron, strontium and the like. These processes are, however, attended with the disadvantage that the acetone formed begins to decompose even at temperatures at which the conversion is not yet quantitative.

Attempts have also been made to convert the vapors of dilute acetic acid into acetone by passing the same over heated coke. Iron contact tubes have been used for this purpose, including tubes of abnormally large surface area. In this case the catalytic action was entirely due to the iron walls, and was attended with the same defects as when employing pure iron for the catalysis.

These defects have led to the mistaken conclusion that the poor yields, hitherto obtained in the above described processes for preparing acetone, are attributable to the low heat conductivity of the catalysts employed. For this reason it has also been proposed to employ catalysts, prepared by coating metal balls with catalytically reacting substances, such as lime, baryta and the like. These combined catalysts were employed for the conversion in contact chambers of steel, copper, aluminum and the like. The same disadvantages were encountered, however, as when employing lime, baryta and the like as catalysts.

According to this invention it has been unexpectedly found that the reaction can not only be carried out at relatively high temperatures but that the already formed acetone can be prevented from decomposing, if, in the production of acetone from acetic acid, acetylene, alcohol or other ketonizable substances or mixtures of the same, the process of catalysis is effected by diluting the vapors with steam and passing the diluted vapors at comparatively high temperatures over carbonaceous catalysts contained in chambers, the walls of which consist of substances, which, during the process of the reaction, have no substantial decomposing action on the acetone formed. The temperatures are those generally employed in the manufacture of acetone, that is, between 400 and 500° C.

Examples of suitable carbonaceous catalysts are wood charcoal, animal charcoal, bone charcoal, activated charcoal and the like, which may, if desired, be covered or impregnated with catalytically active substances, which themselves also have no decomposing action on the acetone, such as oxides, acetates and the like of iron, calcium, zinc, cerium, thorium, etc.

The choice of the catalysts depends on the nature of the initial material.

The hitherto known processes, however, also possess the considerable disadvantage that the catalysts employed lose their activity after a relatively short time, thereby giving rise to a considerable decline in production. This is avoided by employing catalysts, consisting of or containing carbonaceous material, as described above.

The following materials, which have no detrimental effect on the process of catalysis, may be suitably employed for the walls of the contact apparatus: copper, copper alloys, aluminium, acid-resisting iron alloys, such as Krupp's V2a steel, ceramic masses and the like. Any copper alloy is suitable, but especially alloys with zinc, tin, silver, nickel. The so-called Krupp's V-steel (V2a, V4a etc.) contains as essential constituents besides iron, approximately 18% of chromium together with nickel and, if desired, molybdenum or copper. The V2a steel which is a well known material is a steel containing chromium and nickel. When acetylene, alcohol or other non-acid reacting products are employed as initial materials, the walls of the contact chamber may consist of iron, since in this case iron also will have no substantial decomposing action on the acetone formed, and can, therefore, be included in the materials, which, during the course of the reaction have no substantial decomposing action on the acetone formed.

In the process of ketonizing acetylene, alcohol and the like, by employing catalysts, which essentially contain carbon (active charcoal) and some zinc oxide or cadmium oxide, the disadvantage very readily occurs that, during the reaction, the zinc oxide or cadmium oxide escapes with the reaction vapors, whereby the zinc or cadmium content is lowered and consequently after a short time the activity of the catalysts decreases. This disadvantage can be readily overcome by depositing strongly basic substances, such as lime, baryta and the like, together with the zinc, or by previously combining the zinc or cadmium with the same.

An economical and particularly advantageous modification of the process consists in using inexpensive initial materials, such as wood vinegar (pyroligneous acid). For this purpose a catalyst, such as wood charcoal, is with advantage employed, the regeneration of which need not be taken into consideration, owing to the low cost of the material. In order to carry out the process continuously and uniformly and in order to maintain the maximum efficiency of the ketonizing reaction, a contact chamber is employed, into which the fresh contact mass is continuously fed, and from which the spent catalyst is at the same time removed.

For this purpose a reaction chamber, provided with valved chambers or the like, is employed, by means of which fresh catalyst, for example wood charcoal, can be continuously or semicontinuously introduced during the operation, whilst the spent catalyst (charcoal) can be withdraw also continuously or semicontinuously from the bottom of the contact apparatus.

In the drawings:—

Figure 1 is a diagrammatic representation of one form of apparatus employing the aforesaid valved chambers and Figure 2 is a diagrammatic representation of a complete apparatus particularly for ketonizing very impure and dilute acetic acid.

Referring to Figure 1 the contact apparatus consists substantially of the reaction chamber $a$, which is filled with contact material, for example granulated wood charcoal $b$. The reaction chamber $a$ is surrounded by a hot jacket $c$. Valves $d^1$ and $d^2$ are disposed in the upper and lower portions of the reaction chamber respectively. Fresh contact material can be introduced periodically or continuously from a hopper-like storage container $e$ through the upper valve $d^1$ and spent contact material be withdrawn through the valve $d^2$ situated at the lower end of the reaction chamber. The acetic acid-steam vapors are introduced into the apparatus at $d$, whilst the acetone formed escapes together with the steam from the upper portion of the apparatus through the conduit 1.

Referring to Figure 2, the actual assembly shown is especially devised as previously mentioned for ketonizing very impure and dilute acetic acid, such as wood vinegar, which contains tarry substances in solution.

The apparatus represents a multiple three stage system. The first stage 1 is operated at an excess pressure of, for example one atmosphere, the second stage 2 at, for example, normal pressure, and the third stage 3 at, for example, about ½ an atmosphere. In order to operate each of these stages there are required: a wood vinegar vaporizer V, a super-heater U and a contact chamber K.

Preheated wood vinegar flows from a suitable container B first into the vaporizer V III (which co-operates with the super-heater $U_3$, contact chamber $K_3$ and the adjacent cooler), in which a working pressure of about ½ atmosphere is maintained by means of a vacuum pump D. Crude acetic acid is vaporized in V III, the vapors heated in $U_3$ to the temperature required for the catalysis, and thereafter the conversion into acetone effected in the contact chamber $K_3$. The resulting vapor mixture is then condensed in the adjacent cooler E, still at a pressure of ½ an atmosphere.

The gases resulting from the catalysis (chiefly carbon dioxide) are aspirated by the air pump D and freed from the accompanying acetone in the scrubber S. The acetone-containing product of catalysis is conveyed by means of the pump $P_3$ into the rectifying column R and there worked up into acetone.

The non-vaporized portion of wood vinegar and the tar are removed from the lower portion of V III by the pump $P_1$ and pumped into the vaporizer V II, which operates at normal atmospheric pressure. Here vaporization takes place in a manner similar to that described above, after which the resulting vapors are superheated in the superheater $U_2$ and converted into acetone in the contact chamber $K_2$. The resulting mixture of acetone vapor and water vapor which also contains carbon dioxide, is then condensed at normal atmospheric pressure in a heating coil which is mounted in V III, and thereby effects the above described vaporization in V III. After the product of catalysis from system 2 has given off its heat of vaporization in the vaporizer V III and has condensed, it is pumped together with the product of the catalysis from system 3 by the pump $P_3$, for example, into the rectifying column R.

The residue of wood vinegar and tar remaining in V II after vaporization is finally forced by the pump $P_2$ into the vaporizer V I in which vaporization is effected at one atmosphere excess pressure by means of fresh steam. The vaporization is carried out to such an extent that substantially only liquid tar remains behind, which is drawn off at the lower end of the still. The vapors are heated, as described above, by the superheater $U_1$ and then converted into acetone in the contact chamber $K_1$. The resulting vapor mixture is condensed at one atmosphere excess pressure in a heating coil, which is mounted in V II, and thereby gives off its heat of vaporization to the wood vinegar, which is vaporized at normal pressure in V II as described above. The liquid mixture of acetone and water condensed under pressure together with the acetone-containing solutions from V III and the adjacent cooler are aspirated from the system 3 by the pump $P_2$ and forced into the rectifying column. The non-condensable gases (carbon dioxide) resulting from the catalysis are collected by means of deaerating leads and conveyed to the cooler E, which is arranged behind the system 3. From this point the gases are aspirated by the air pump D and freed in the scrubber S from accompanying acetone by means of water.

By means of this apparatus considerable economy in heat can be effected, a feature which is of considerable value in ketonizing reactions, which are operated with comparatively large quantities of steam.

In order to produce as clearly defined and uniform a temperature as possible within the contact chamber the gas or vapor mixtures undergoing catalysis are with advantage preheated to the reaction temperature before the process of catalysis, this being with advantage effected in a super heater, the walls of which have no chemical action on the vapors.

What we claim is:—

1. A process of manufacturing acetone from a ketonizable compound of the group consisting of acetic acid, acetylene, acetaldehyde, ethyl acetate, which comprises mixing the vapor of the initial substance with steam, and passing the mixture into a reaction chamber at a temperature between 400 and 500° C. in the presence of a ketonizing catalyst of carbonaceous material, the walls of the reaction chamber consisting of a substance selected from the group consisting of copper; copper alloys of zinc, tin, silver or nickel; aluminum; steel alloy containing 18% chromium with nickel; ceramic masses.

2. The process set forth in claim 1, wherein the catalyst consists of porous charcoal.

3. The process set forth in claim 1, wherein the catalyst consists of a carbonaceous material containing zinc oxide.

4. The process set forth in claim 1, wherein the catalyst consists of porous charcoal containing zinc oxide.

5. The process set forth in claim 1, wherein the catalyst consists of charcoal containing one of the substances of the group consisting of oxides and acetates of iron, calcium, zinc, cerium and thorium.

6. The process set forth in claim 1, wherein the catalyst is periodically fed and the spent catalyst is periodically removed from the reaction chamber.

7. The process set forth in claim 1, wherein the catalyst is continuosly fed and the spent catalyst is continuously removed from the reaction chamber.

8. The process set forth in claim 1, wherein the steps are carried out in stages so that the vaporous product of catalysis of one stage is employed for vaporizing fresh quantities of a material in a later stage.

9. The process set forth in claim 1, wherein the steps are carried out in stages so that the vaporous product of catalysis of one stage is employed for vaporizing fresh quantities of a material in a later stage, the hot product of catalysis of the first stage being directly subjected to rectification.

10. The process set forth in claim 1, wherein the vapors undergoing catalysis are conveyed into the reaction chamber in a superheated condition.

11. A process of manufacturing acetone from a substance containing acetic acid, which comprises mixing the vapor of the initial substance with steam, and passing the mixture into a re-action chamber at a temperature between 400 and 500° C. in the presence of wood-charcoal, the walls of the re-action chamber consisting of a material selected from the group consisting of copper; copper alloys of zinc, tin, silver or nickel; aluminum; steel alloy containing 18% chromium with nickel; ceramic masses.

12. A process of manufacturing acetone from pyroligenous acid, which comprises mixing the vapor of the pyroligenous acid with steam, superheating the mixture, and passing the mixture into a re-action chamber at a temperature between 400 and 500° C. in the presence of wood-charcoal, the walls of the reaction chamber and of the superheating apparatus consisting of a substance selected from the group consisting of copper; copper alloys of zinc, tin, silver or nickel; aluminum; steel alloy containing 18% chromium with nickel; ceramic masses.

13. The process set forth in claim 11, wherein the catalyst consists of activated charcoal.

14. The process set forth in claim 12, wherein the catalyst consists of activated charcoal.

In testimony whereof we hereunto affix our signatures this 5th day of February 1931.

HANS WALTER.
HERMANN SCHULZ.